3,297,892
SYSTEM FOR CONTROL OF AUTOMATIC ELECTROMAGNETIC AUTOMOBILE CLUTCH
David Grigorjevich Poljak, Jury Ivanovich Egorov, and Nikolai Alexeevich Shereshev, all of Moscow, U.S.S.R., assignors to Moscowsky Zavod Malolitrazhnykh, Avtomobilei
Filed June 7, 1963, Ser. No. 286,267
1 Claim. (Cl. 310—95)

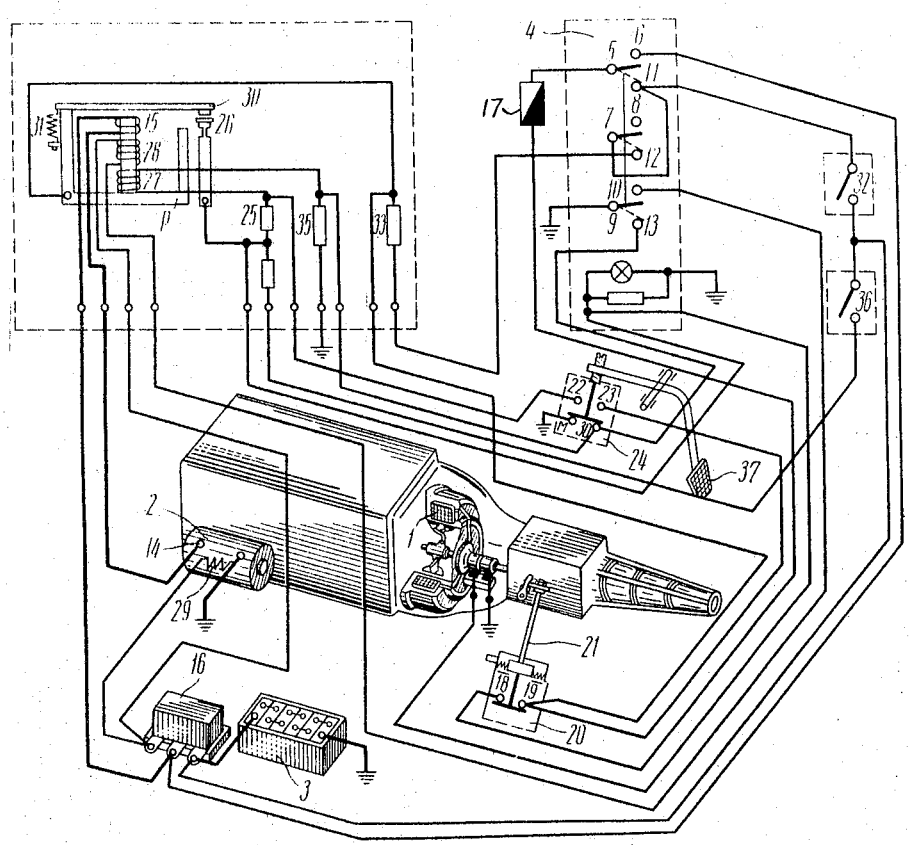

This invention relates to automatic electromagnetic clutches, and more specifically to systems for the control of automatic clutches.

It is known that in electromagnetic clutches the torque transmitted is dependent on the current flowing through the winding thereof. Automatic regulation of the current vs. engine speed is obtained by connecting the clutch winding across the generator armature winding, and the current to the generator field winding is supplied through resistors, thus assuring the necessary generator voltage rise for smooth starting. To ensure starting on a heavy climb, these resistors are chosen so that the generator voltage reaches its rated value at an engine speed corresponding to an engine torque that is nearly maximum. Such a characteristic meets the above requirements for the clutch operation, but the battery charging conditions are then worsened, as in such case the engine speed rises sharply for the initiation of battery charging.

To ensure normal battery charging at travelling speeds above 15–20 km./hour, irrespective of the gear used, (i.e. engine speed) in known control systems use is made of a special centrifugal regulator with a drive from the driving gearbox shaft, and also a series of change-over relays that complicate the automatic clutch control system.

The system in accordance with the present invention is free of the above shortcomings.

The object of this invention is to simplify the clutch control system by making use of a small number of circuit change-over units.

A further object of the invention is to maintain optimum generator characteristics thus ensuring normal battery charging.

The invention also provides for smooth starting, satisfactory climbing, and convenient control.

In contradistinction to know systems, the present system of clutch control employs a three-coil relay having one of its coils connected across the generator armature winding, a second across the generator shunt field winding, and the third in series with the generator armature winding. This relay shorts out automatically the adjusting resistance in the clutch winding circuit at the pre-set engine speed and also permits obtaining the necessary relation of the current in the clutch winding vs. engine speed without affecting the generator characteristics, which, in turn, ensures initiation of the battery charging at low engine speed.

Further objects and advantages of the invention will become more readily apparent to persons skilled in the art from the following detailed description and attached drawing, in which the sole figure is a diagrammatic view of an automatic electromagnetic clutch control system embodying the present invention.

The present automatic electromagnetic clutch control system provides for current to a clutch field winding 1 being supplied either from a generator 2, or a battery 3. Under normal conditions of travel, current to the clutch field winding must be supplied from the generator 2 and to accomplish such end, a supply switch 4 must be set to "Generator" (C). More specifically upper contacts 5–6, 7–8, and 9–10 of the supply switch must be closed.

A supply of current to the clutch field winding 1 from the battery 3 would be required in the event of breakdown of the generator 2, or if the engine is to be started by towing the vehicle. It is also desirable to supply current to the clutch winding from the battery if the engine is not completely warmed up, and the engine idling speed is to be raised to prevent stalling. In the case of current supply to the clutch winding from the battery, switch contacts 5–11, 7–12, and 9–13 must be closed.

With the supply switch 4 set to "Generator," current from armature 14 of the generator 2 passes through a compensating coil 15 of the relay, relay-regulator 16, fuse 17, normally closed contacts 18–19 of a clutch switch 20 mounted on gear shift lever 21, and through contacts 22–23 of choke 24, to the clutch field winding 1 via resistor 25. The resistor 25 permits, at low engine speed the clutch winding to be supplied with a reduced current which is a necessary condition for smooth starting. The resistor remains in the circuit with the engine speed under 1600–1700 r.p.m., and then, when such speed is reached, it is shorted out by a contact 26 of a three-coil relay. The current through the clutch field winding 1 then reaches its maximum value as it is supplied to the clutch winding by-passing the resistor 25, and the clutch is then completely engaged. As stated above, the resistor 25 is shorted out by the three-coil relay, main coil 27 of which is connected across the armature winding of generator 2, and current is supplied with the contacts 5–6, 18–19, and 22–23 being in the closed position. With the engine speed varying, the ampere-turns of this coil vary as the generator voltage. A follow-coil 28 is connected across generator field winding 29 so that with the engine speed varying, the ampere-turns of this coil vary in proportion to the voltage across the generator field winding. The coils 27 and 28 are connected so that their ampere-turns are opposed and as the engine speed rises, the adjusting ampere-turns of the coils 27 and 28 gradually increase. When the resulting ampere-turns reach a certain value, movable relay armature 30 closes the contact 26, and current is supplied to the clutch winding 1 by-passing the resistor 25. By adjustment of the tension of a spring 31, the contact 26 can be caused to close, and the relay operate at any engine speed. For the speed at which the relay is to operate not to depend on the charging of the battery and the total number of instruments in the circuit, the compensating coil 15 is in series with the generator armature winding. The ampere-turns of the coil 15 vary in proportion to the generator load and by suitably selecting the characteristics of the coils 27, 28, and 15, it is possible to arrange for the resulting ampere-turns to rely very little on the load current when all three coils act simultaneously in the region of the pre-set engine speed.

With the vehicle running, the release of accelerator pedal 37 would provide for either engine braking or run-up, depending on whether the relay has been operated prior to the instant of the pedal release. If the relay has not yet operated (the contact 26 is open), run-up would take place, as the supply circuit to the clutch field winding 1 would be broken since contacts 22–23 of the choke 24 are open. If, on the other hand, at the instant of the release of the accelerator pedal, the contact 26 of the relay is closed, engine braking would take place as current to the coil 27 and the clutch winding would be supplied from the generator armature winding through the closed contact 26 of the relay. The engine braking would continue until, due to the drop in engine speed, the generator voltage drops to a value where the relay releases the armature 30 and the contact 26 opens.

To provide for engine braking at low speeds, contacts 30–M are provided in the switch of the choke 24 to short-circuit resistor 35 connected in series with the coil 27 of the relay. If it is necessary to change-over to run-up at high engine speed, (the relay connected) it is sufficient to release the accelerator pedal 37 to open the contacts 22–23 and depress the gear shift lever 21 once for short-time opening of the contacts 18–19 of the clutch switch 20. The supply circuit to the coil 27 of the relay would be broken for a short-time and the relay disconnected. Subsequent closing of the contacts 18–19 by the gear shift lever being released would not cause a closing of the clutch winding supply circuit as the contacts 22–23 of the choke switch 24 and the relay contact 26 would then be open.

To again engage the clutch, it would be necessary to depress the accelerator pedal thereby resulting in a closing of the contacts 22–23 of the choke switch 24 and the supply circuit to the coil 27 of the relay.

For a current supply to the clutch from the battery 3, the supply switch 4 is set to the dotted line position shown in the drawing. The current from the battery 3 with ignition lock 32 in the "on" position flows through the contacts 5–11, contacts 18–19 of the clutch switch 20, and the closed contacts 7–12 to the resistor 33. The closing of the contacts 9–13 breaks the circuit to the follow-coil 28, and through the contacts M–30 shorts the resistor 35 in the circuit of the main coil 27 of the relay. Due to the breaking of the circuit to coil 28, the ampere-turns of the coil 28 no longer oppose the ampere-turns of the main coil 27 with the shorting of the resistor 35 allowing the ampere-turns of the coil 27 to increase. Thus, in the event of the closing of the contacts 22–23, the relay would operate immediately regardless of the engine speed, and the full battery voltage would be applied across the clutch winding.

The above described engagement of the clutch would only be required in the event the engine was started by towing the vehicle. Under normal conditions of operation, at the instant of starting, it would be necessary to supply after running up only of the vehicle a reduced current to the clutch field winding to ensure a complete engagement of the clutch.

To reduce the current supplied to the clutch field winding 1 at the instant of starting, the contacts 18–19 are opened by depressing the gear shift lever 21. Current to the clutch field winding from the battery 3 is then supplied through the resistors 25 and 33 in which a considerable voltage drop takes place and consequently, with the contacts 18–19 open, the relay does not operate. In order to assure a full current supply to the clutch field winding 1, it would only be necessary to release the gear shift lever 21, thus causing the contacts 18–19 of the switch 20 to close and the relay to operate.

After running-up, the release of the accelerator pedal 37 ensures a transfer to engine braking with such braking continuing until a complete stoppage of the engine, provided the clutch has not been manipulated to release. Similarly, with the braking of the vehicle to prevent engine stoppage, it would be necessary to cause the clutch to release prior to the complete stoppage of the vehicle. For this purpose, it would suffice to depress the gear shift lever 21 for a short-time in order to open the contacts 18–19 and break the supply circuit to the main coil 27 of the relay.

For braking the vehicle with the engine stopped and without applying the hand brake, a parking switch 36 has been included in the system, and the closing of the switch 36 ensures that current will be supplied to the clutch field winding 1 through the resistor 35. This action engages the clutch, and if the gear has been previously engaged, a braking of the vehicle would be achieved.

The invention is not to be confined to any strict conformity to the showings in the drawing but changes and modifications may be made therein so long as such changes and modifications mark no material departure from the spirit and scope of the appended claim.

What we claim is:

A system for the automatic control of an electromagnetic clutch for a vehicle having an engine, comprising a clutch field winding circuit, a supply switch therefor, an adjusting resistance in series with the clutch field winding, a generator provided with an armature, a shunt field winding and an armature winding, a three coil relay, one of the coils being connected across the generator armature winding, the second of the coils being connected across the generator shunt field winding and the third of the coils being connected in series with the generator armature winding whereby the relay is operative to short out the adjusting resistance from the clutch field winding circuit at a pre-set engine speed.

References Cited by the Examiner
UNITED STATES PATENTS
2,395,904   3/1946   Oetzel _____ 310—93

MILTON O. HIRSHFIELD, *Primary Examiner.*

D. X. SLINEY, *Examiner.*